May 19, 1931. E. J. HENTSCHEL ET AL 1,806,397
COMPRESSION VALVE AND FAUCET
Filed June 12, 1928
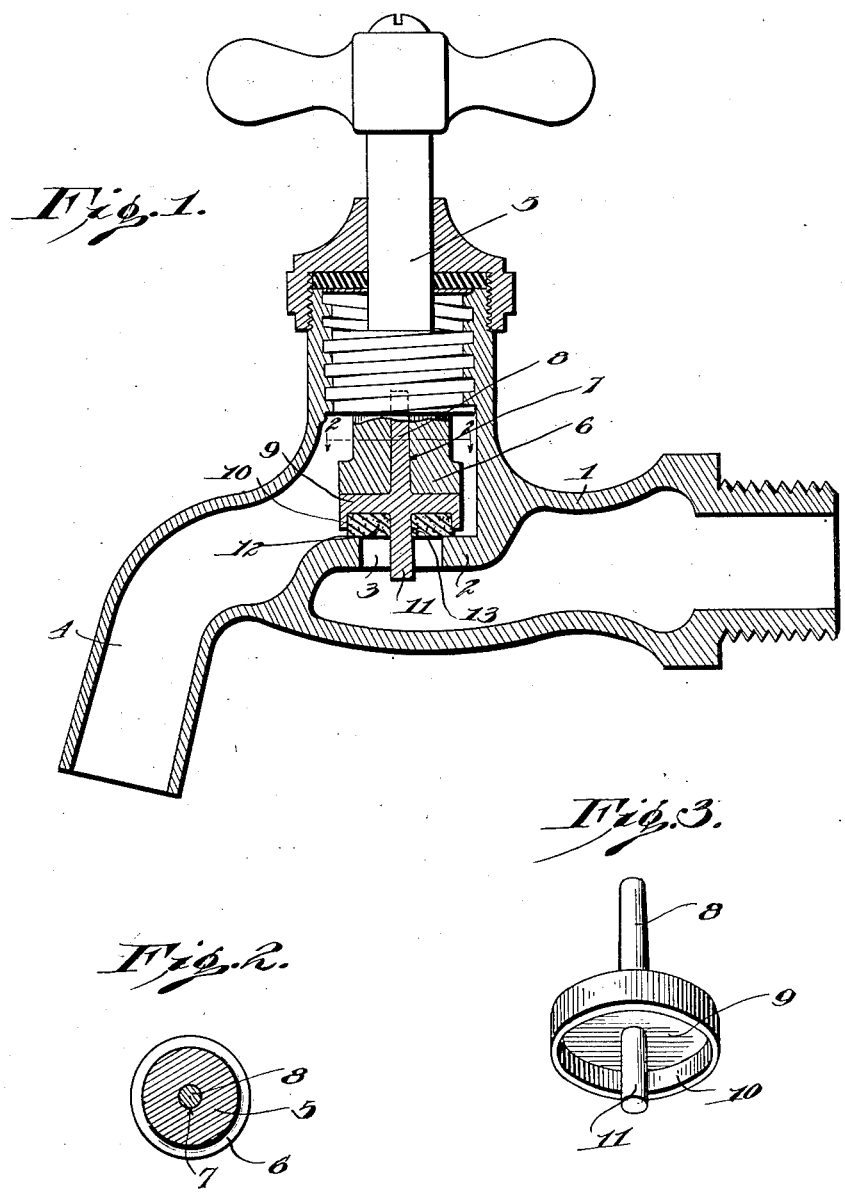
INVENTOR
S. E. Miller and
E. J. Hentschel,
BY
ATTORNEY Patented May 19, 1931

1,806,397

UNITED STATES PATENT OFFICE

ELMER J. HENTSCHEL AND SAMUEL E. MILLER, OF SPRINGFIELD, OHIO

COMPRESSION VALVE AND FAUCET

Application filed June 12, 1928. Serial No. 284,739.

This invention relates to improvements in compression valves or faucets, and one of the objects is to provide simple means for attaching a gasket to the movable valve member, and for easily detaching the gasket should an occasion for so doing arise.

Other objects and advantages appear in the following specification, reference being had to the accompanying drawings in which Figure 1 is a longitudinal section of a compression valve or faucet, the improvement being shown applied, Figure 2 is a cross section taken on the line 2—2 of Figure 1, Figure 3 is a perspective view of the gasket adaptor.

It often happens that the gaskets of water faucets such as are found in connection with sinks, wash bowls and the like become worn to a point whereat they will fail to hold compression, in other words, the faucet will leak water no matter how hard the movable valve member is turned down. Under such a circumstance it becomes necessary to remove said valve member in order that a gasket may be fitted in place.

Sometimes the screw which holds the gasket is difficult to remove, and it is herein proposed to provide an adaptor which is designed not only to carry a gasket, but also to facilitate the removal and replacement of the gasket. The nature of the adaptor is such that the customary screw threads in the end of the movable valve member can be eliminated, thus eliminating an item of labor in constructing the faucet.

Reference is made to the drawings. A faucet body 1 of any known design or construction includes a web 2 which has a port 3 through which liquid may flow to the outlet 4. The movable valve member 5 is of a familiar construction in all of its parts with the exception of the head 6 which in this instance is devoid of the peripheral flange customarily seen in devices of this sort.

A central bore 7 receives the stem 8 of a gasket adaptor which, in addition to the stem 8, comprises a plate 9, peripheral flange 10 and stud 11. The stem 8 has, by preference, a slight taper, so that the adaptor will stay in place against the head 6 when the stem is forced into the bore 7. A gasket 12 has a central hole 13 to receive the stud 11 when the gasket is fitted in position against the plate 9 within the peripheral flange 10. The diameter of the gasket and the hole are such that a tight fit will be made with the interior of the flange 10 and with the exterior of the stud 11 at its base. This will insure the prevention of the gasket from dropping off.

In applying the adaptor to the movable valve member of a faucet it is only necessary to first apply a gasket to the adaptor in the manner stated, then to insert the stem 8 into the bore 7. Although a tight fit is desired at this point to accomplish the purpose, the pressure of water will aid in a large measure in holding the adaptor in place. The threading of the bore 7 and the provision of the customary screw are thus obviated. The customary flange on the head 6 of the valve member is eliminated, the plate 9 setting flush against the head. The diameter of the plate and flange is the same as that of the head as is plainly seen in Figure 1.

Upon desiring to remove the gasket it is only necessary to take hold of the stud 11 with a pair of pincers, presuming the valve member to have been removed from the body 1, whereupon the gasket 12 is easily gotten at for such operations as may be necessary to abstract it.

While the construction and arrangement of the improved compression valve or gasket is that of a generally preferred form, obviously modifications and changes may be made without departing from the spirit of the invention or the scope of the claim.

We claim:—

In a faucet, a movable valve member having a head with a bore, a gasket having a hole, a plate engageable by the gasket, a tapering stem extending from the plate receivable by the bore, and a smooth-sided imperforate stud projecting from the plate and through the hole, said stud having the gasket formed thereon and providing means to be gripped for abstracting the stem from the bore.

Signed at Springfield in the county of Clark and State of Ohio this ninth day of June A. D. 1928.

SAMUEL E. MILLER.
ELMER J. HENTSCHEL.